United States Patent [19]

Callan et al.

[11] Patent Number: 5,038,317
[45] Date of Patent: Aug. 6, 1991

[54] PROGRAMMABLE CONTROLLER MODULE RACK WITH A RELATIVE RACK SLOT ADDRESSING MECHANISM

[75] Inventors: John E. Callan; Anthony G. Gibart, both of Milwaukee, Wis.; Kazuaki Kume, Bisai; Shigeru Ina, Kariya, both of Japan

[73] Assignee: Allen-Bradley Company, Inc., Milwaukee, Wis.

[21] Appl. No.: 223,312

[22] Filed: Jul. 25, 1988

[51] Int. Cl.[5] .................. G06F 13/14; G06F 13/00; G05B 19/00
[52] U.S. Cl. .................. 364/900; 364/926.9; 364/949; 364/929.2; 364/942.3; 364/927.92; 364/940; 364/955; 364/137
[58] Field of Search ... 364/200 MS File, 900 MS File, 364/140, 137; 340/825.03

[56] References Cited

U.S. PATENT DOCUMENTS

| | | | |
|---|---|---|---|
| 3,942,158 | 3/1976 | Dummermuth | 340/172.5 |
| 4,050,098 | 9/1977 | Seipp | 364/900 |
| 4,165,534 | 8/1979 | Dummermuth et al. | 364/900 |
| 4,250,563 | 2/1981 | Struger | 364/900 |
| 4,293,924 | 10/1981 | Struger et al. | 364/900 |
| 4,360,913 | 11/1982 | Struger et al. | 370/112 |
| 4,404,651 | 9/1983 | Grudowski | 364/900 |
| 4,442,504 | 4/1984 | Dummermuth et al. | 364/900 |
| 4,504,927 | 3/1985 | Callan | 364/900 |
| 4,876,664 | 10/1989 | Bittorf et al. | 364/900 |
| 4,882,702 | 11/1989 | Struger et al. | 364/900 |

Primary Examiner—Michael R. Fleming
Assistant Examiner—Gopal C. Ray
Attorney, Agent, or Firm—Quarles & Brady

[57] ABSTRACT

A programmable controller includes a number of equipment racks having slots which receive a processor module and a plurality of input/output modules. Each rack has a backplane which includes a number of buses for electrically interconnecting the modules therein, one of these buses carries slot address signals identifying the slot containing an input/output module which the processor module seeks to access. The backplanes of the racks are connected together in a daisy chain. Each backplane has a circuit which responds to the addresses of that rack's slots by producing enable signals for the module in the corresponding slot. This backplane circuit also subtracts the number of slots in its rack from the slot address and passes the result to the next rack in the daisy chain. By this justification of the slot address as it is passed down the daisy chain, each rack address decoder circuit can be hard wired to respond to slot addresses between zero and X, where X is the number of slots in that rack; regardless of the rack's relative position within the daisy chain and the range of virtual addresses for its slots.

15 Claims, 4 Drawing Sheets

PROGRAMMABLE CONTROLLER MODULE RACK WITH A RELATIVE RACK SLOT ADDRESSING MECHANISM

BACKGROUND OF THE INVENTION

The present invention relates to programmable controllers having a plurality of modules for performing different functions which operate a machine in response to the execution of a control program; and more particularly to a mechanism for identifying each type of module within the programmable controller.

Programmable controllers are typically connected to industrial equipment, such as assembly lines and machine tools, to sequentially operate the equipment in accordance with a stored control program. One type of such programmable controller is disclosed in U.S. Pat. No. 4,293,924 and consists of a rack which contains several functional modules. A rack backplane provides signal buses and connectors for electrically coupling the functional modules. One of these modules contains a processor which sequentially executes the control program. The control program is stored in a memory within the processor module and is executed to examine the condition of selected sensing devices on the controlled equipment, or to energize and deenergize selected operating devices on the controlled equipment contingent upon the status of one or more of the examined sensing devices. Also contained within the rack are a number of input/output (I/O) modules, which interface the processor to the sensing and operating devices. A given programmable controller can have a variety of different types of I/O modules, such as a.c. inputs or outputs, d.c. inputs or outputs, analog inputs or outputs, and open or closed loop positioning modules.

One of the benefits of this type of programmable controller is that as the need exists, it can be expanded by adding more racks and daisy chaining their backplane buses. In such an expanded controller, a system must be provided for addressing each module in the daisy chained racks. One such system assigns a unique address to every module position in the racks and incorporates an address decoder on each rack's backplane. The address decoder responds to the range of module position addresses for the rack by sending an enable signal to the module in the addressed position.

A problem encountered with this addressing system is that the decoder in each rack must be manually configured in order to identify the range of module position addresses to which it will respond. The range of addresses for a given rack depends upon the number of module positions in the racks which precede it in the daisy chain. Since manual configuration opens up the possibility of human error, an automatically configurable addressing system is preferred.

SUMMARY OF THE INVENTION

A programmable controller system is formed by a series of racks each having slots for receiving a plurality of functional modules and a processor module. The modules are electrically coupled together by signal buses and connectors on a backplane in each rack with the backplanes of the series of racks electrically connected in a daisy chain fashion. One of the backplane signal buses carries the address of the slot containing the module that the processor module seeks to access.

Each rack includes a circuit which decodes the slot address and produces an enable signal for a module therein that is being addressed by the processor module. The circuit also subtracts the number of slots in its rack from the received slot address to produce a converted slot address which is then passed on to the next rack in the chain. The converted slot address is relative to the first slot of the next rack in the daisy chain. For example, if the first slot of the next rack is being addressed, the converted address will be zero which is the relative slot address with respect to that first slot. Because of the slot address conversion, every rack decoding circuit responds to the same set of relative addresses regardless of its actual position in the daisy chain.

The general object of the present invention is to provide a programmable controller which may be expanded by daisy chaining a series of racks into which additional functional modules may be placed.

Another object of the present invention is to provide a system for addressing the functional modules in each of the daisy chained racks.

A further object is to provide such an addressing system in which each rack has a circuit for decoding the addresses for its modules which circuit does not have to be manually configured to recognize a given range of addresses.

Still another object of the present invention is to provide a circuit within each of the daisy chained racks which will decode the addresses for the modules received in that rack independent of the rack's position within the daisy chain.

DETAILED DESCRIPTION OF THE PRESENT INVENTION

Figure 1:
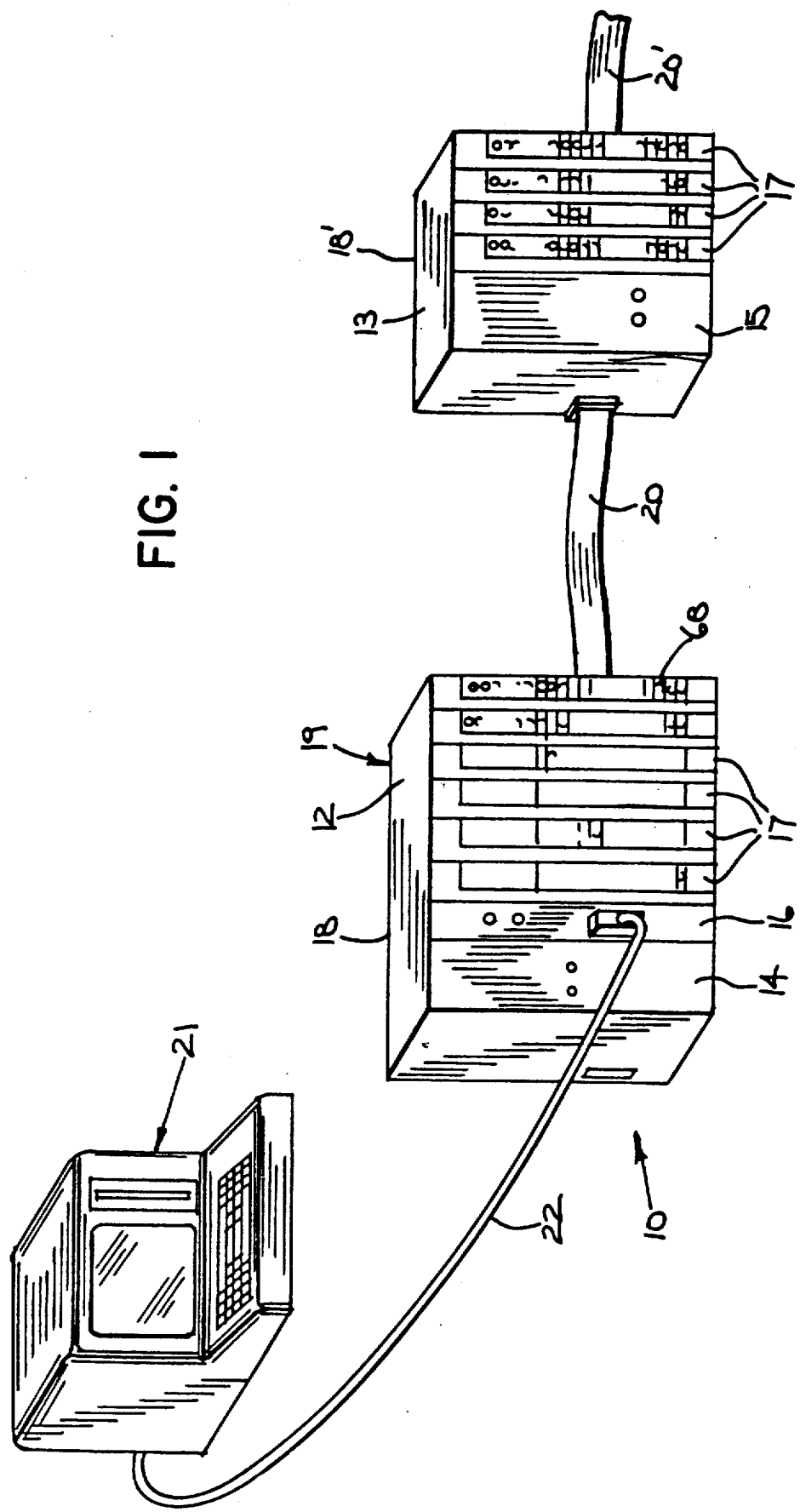
FIG. 1 is a pictorial representation of a programmable controller according to the present invention.
Figure 2:
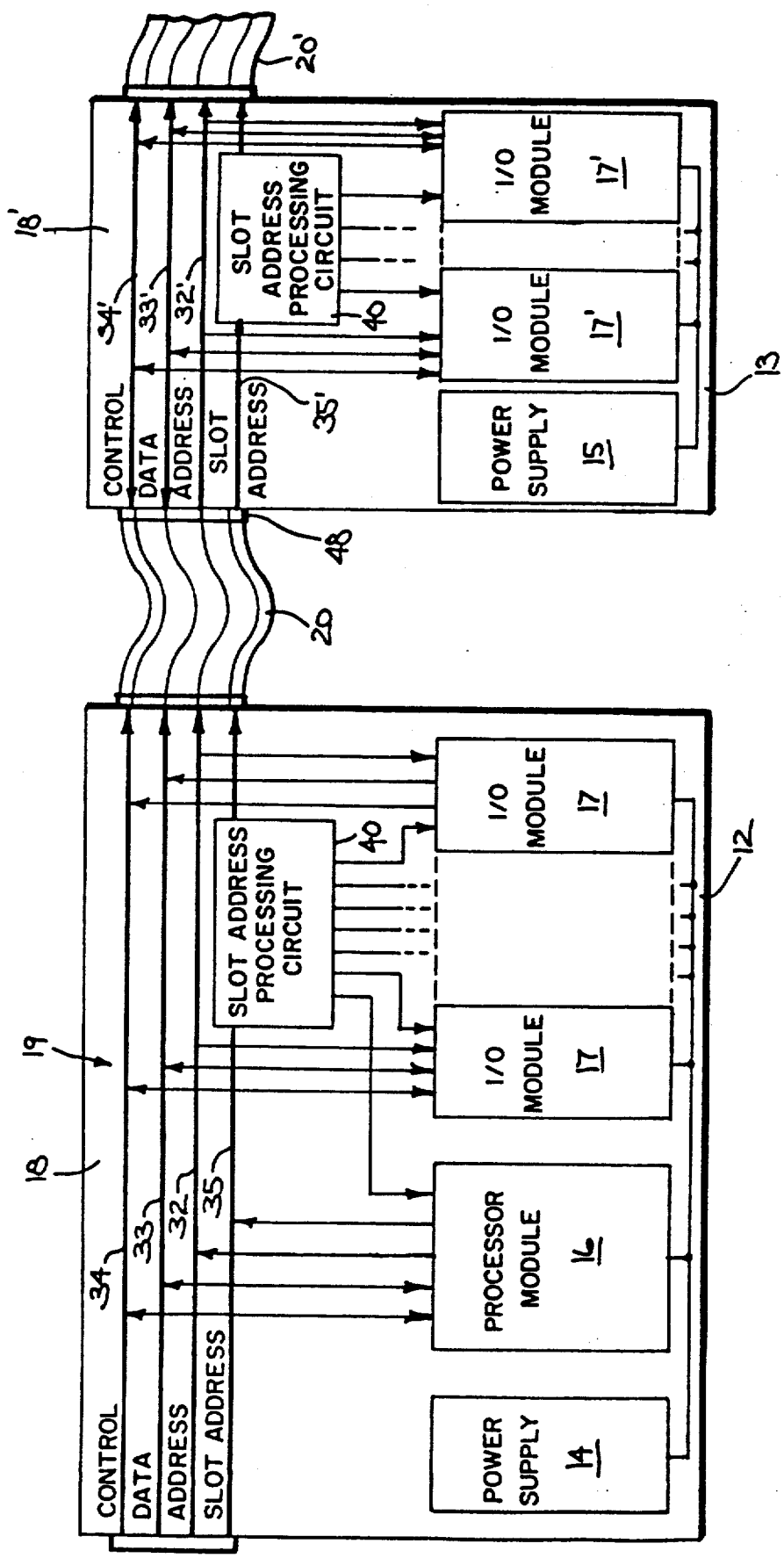
FIG. 2 is a schematic representation of the electrical interconnection of the racks and modules of the programmable controller.

With initial reference to FIGS. 1 and 2, a programmable controller, generally designated as 10, includes two racks 12 and 13 with separate power supplies 14 and 15 respectively. Each of the racks 12 and 13 has a number of slots within which different functional modules 16 and 17 can be received. A unique address is assigned to each rack slot in order to access the module received therein. The two racks 12 and 13 also include a backplane 18 and 18' respectively, having electrical connectors and conductor buses which interconnect the functional modules 16 and 17 and provide power to the modules from the power supplies 14 and 15. Specifically, the backplanes 18 and 18' respectively incorporate a parallel address bus 32 and 32', a parallel data bus 33 and 33', a set of control lines 34 and 34', and a five bit parallel slot address bus 35 and 35'. Although separate address and data buses 32 and 33 have been shown, a common bus onto which address and data signals are time multiplexed can also be used. A separate connector is provided on the backplane for each slot in the rack to couple these buses and control lines to a module in the slot. A multiconductor cable 20 interconnects the backplanes 18 and 18' of the two racks 12 and 13 to form a common system backplane, designated 19. Another multiconductor cable 20' extends the system backplane from the second rack 13 to other racks of the programmable controller which are not illustrated. The racks are connected in a daisy chain by the cables 20 and 20'.

The first rack 12 contains a processor module 16 which executes a user defined control program stored in the module's memory to operate a machine coupled to the programmable controller 10. A programming terminal 21 is connected by a cable 22 to the processor module 16 for monitoring the operation of the programmable controller and for programming the processor module 16. The processor module 16 is connected to the backplane buses 32, 33 and 35 and control lines 34.

The first rack 12 also contains a number of input/output modules 17 which electrically interface the processor 16 to sensing and operating devices on the machine controlled by the programmable controller 10. As used herein, the term I/O module refers to a module which interfaces to external devices on the controlled machine. Such I/O modules can have solely an input function, solely an output function, or both input and output functions. I/O modules which provide an input function couple the processor module 16 to sensing devices on the controlled machine, while the output function modules interface to operating devices on the controlled machine. Each of the I/O modules may be an a.c. input or output device, a d.c. input or output device, or provide an input/output interface to analog devices, such as resolvers and position indicators. The typical programmable controller 10 includes a mix of different types of I/O modules.

Figure 3:
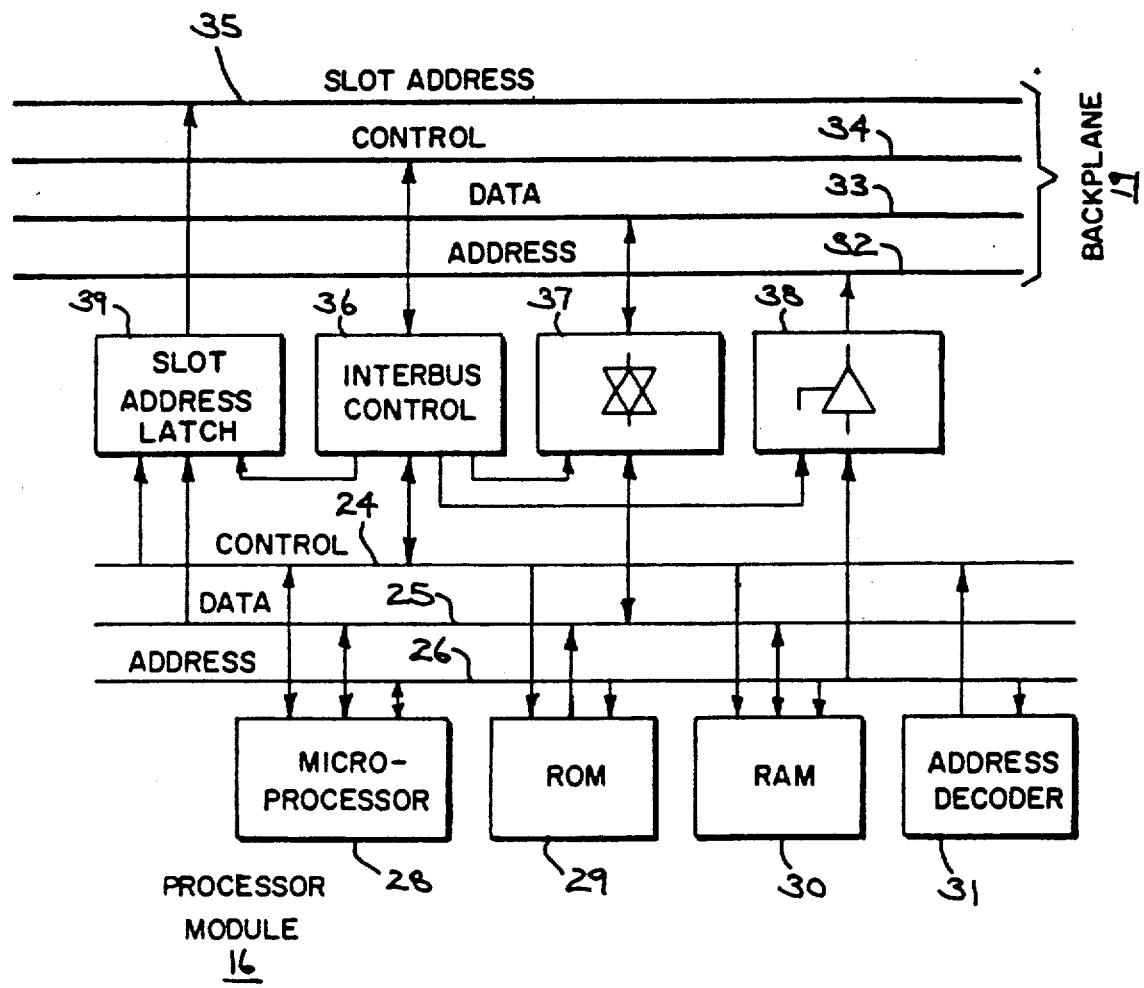
FIG. 3 is a schematic block diagram of the programmable controller processor module.

The different components of the processor module 16, shown schematically in FIG. 3, are interconnected by a set of three internal buses: a control bus 24 consisting of a number of individual control lines running between different components, a parallel data bus 25 and a parallel address bus 26. A microprocessor 28 is coupled to the three internal buses 24-26. Depending upon the type of microprocessor 28, the address and data signals may be multiplexed onto a shared internal bus with a control signal indicating which type of signal is being carried on the shared bus at any given time. The microprocessor 28 executes an operating system program stored in a read only memory (ROM) 29 which controls the overall operation of the programmable controller 10 and executes a user defined machine control program that is stored within a random access memory (RAM) 30. Also stored in RAM 30 is a standard input/output data table which retains the status of the sensing and operating devices. The RAM 30 also provides storage locations for counters, timers and intermediate computation values used by the microprocessor 28 in executing the operating and user control programs. An address decoder 31 responds to specific addresses sent over the module address bus 26 by generating control signals on bus 24 which enable the microprocessor to access memories 29 and 30, as well as the system backplane 19.

Access to the system backplane buses 32-35 by either the processor module 16 or by another module is governed by an interbus control circuit 36 which can comprise any of several well known circuits for performing bus access arbitration. In response to the proper request signal, the interbus control circuit 36 enables a set of bidirectional data buffers 37 to couple the internal data bus 25 of the processor module 16 to the backplane data bus 33. Similarly, the interbus control 36 enables a set of address buffers 38 to couple the processor module address bus 26 to the backplane address bus 32. A slot address latch 39 can be enabled by the interbus control circuit 36 to apply a five bit data word in parallel from the processor module data bus 25 to a backplane slot address bus 35.

The interconnection of the internal buses of the processor module 16 to those of the backplane 19 enables the microprocessor 28 to selectively access any one of the I/O modules 17 in the racks 12 and 13. As far as the operation of the processor module 16 is concerned, the interconnected racks are viewed as one large rack with many slots and modules. In such a system, the slot closest to the processor module 16 is designated as slot address 1 and the address of each slot going away from the processor module increases along the chain. The first rack 12 has seven slot addresses 0-6, including the address for the slot in which the processor module is located, and the four slots in the second rack 13 have addresses 7-10. To address a given module, the microprocessor stores the address of the module's slot in the slot address latch 39. The interbus control circuit 36 will then enable the slot address latch 39 to apply its contents to the slot address bus 35 across the system backplane 19. This slot address activates the module in the designated slot to respond to signals on the other backplane buses. Once the slot address has been sent, the microprocessor 28 sends the address of a component within the selected module over the backplane address bus 32 by having the interbus control circuit 36 enable the set of address buffers 38. At the substantially same time the interbus control circuit 36 enables the set of data buffers 37 so that data may be exchanged between the addressed I/O module 17 and the processor module 16.

Figure 4:
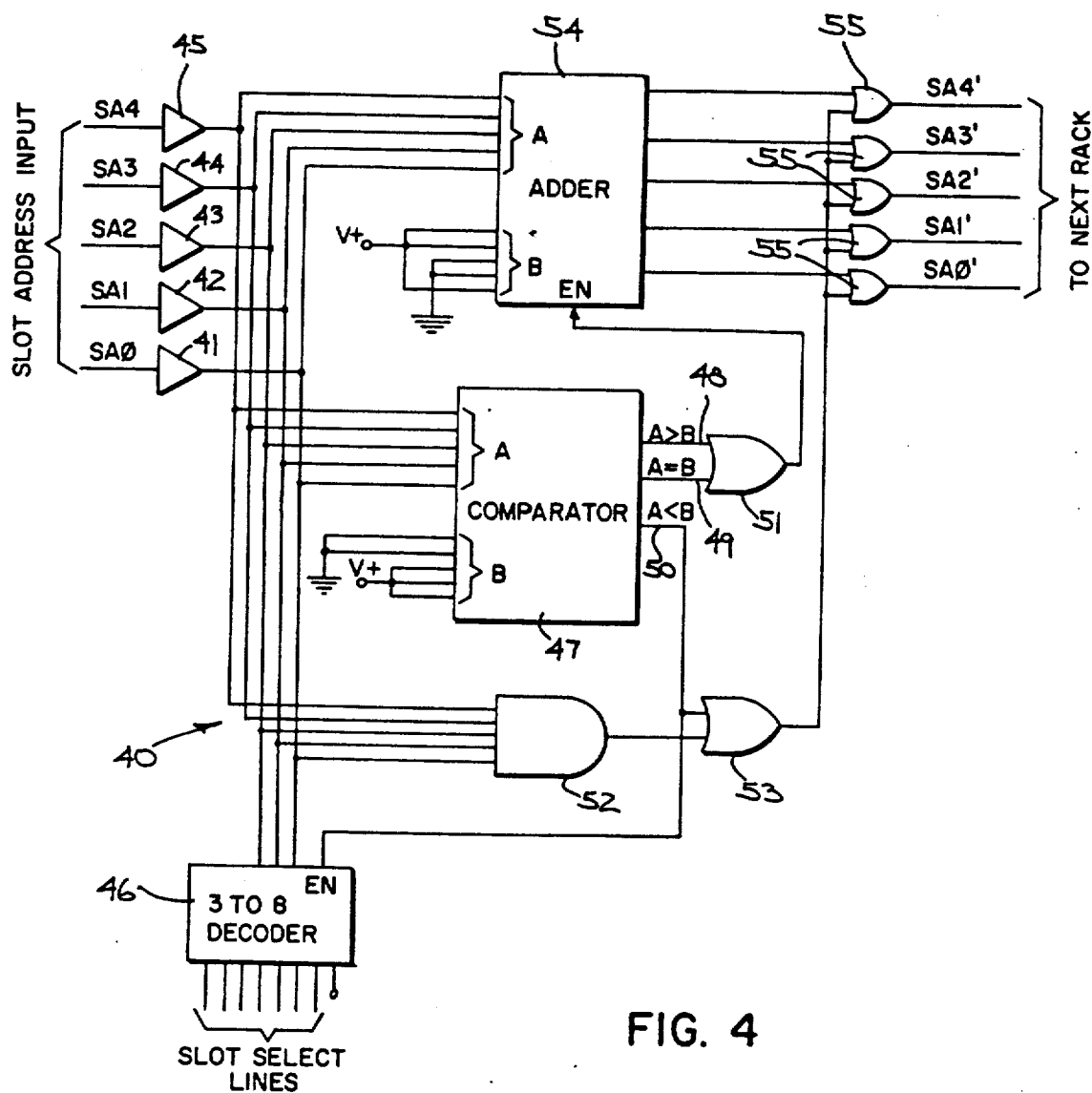
FIG. 4 is a schematic diagram of the slot address processing circuit in each rack.

As illustrated in FIG. 2, the backplane of each rack includes a slot address processing circuit 40, which converts the signals on slot address bus 35 into individual select signals for each of the slots within the respective rack. The details of the processing circuit 40 for the first rack 12 are shown in FIG. 4.

When the processor module 16 seeks to access one of the six I/O modules in slots of the first rack 12, the corresponding slot address from one to six is applied to the slot address bus 35. The five bit lines, designated SA0-SA4, of the slot address bus 35 from the processor module 16 are coupled by five data buffers 41-45 to one input, designated A, of a five bit comparator 47. The bit lines of the other input B to the comparator 47 are hardwired to the number of slots in the first rack 12, i.e. the binary number 00111. The comparator produces an active signal on one of three output lines 48, 49, or 50 depending upon whether the slot address at input A is respectively greater than, equal to or less than the number of slots in the rack.

If the address is for one of the slots in the first rack, it will have a value from zero to six which is less than the number of slots in the rack, i.e. seven. In this case, an active signal will be sent over line 50 from the comparator 47 to the enable input of a three-to-eight decoder 46. The three least significant bit lines SA0, SA1 and SA2 of the slot address bus 35 are coupled to the select input of the decoder 6. Each of the seven output lines from the decoder is connected to a slot select terminal on the backplane connector for a separate one of the seven rack slots. The eighth output of the decoder 46 is not used in the seven slot rack 12. When the decoder 46 is enabled, the binary number represented by the three bits applied to its select inputs renders the corresponding one of the seven output lines active.

At the same time, the active high level signal on comparator output line 50 is also coupled by an OR gate 53 to a first input of five output OR gates 55. The outputs of these five OR gates 55 are designated SA0' to SA4' and are coupled by cable 20 to the input of the slot address bus on the next rack's backplane 18'. As an input of all the output OR gates 55 receive a high level, the slot address applied to the next rack will be all ones, which deselects all modules downstream in the daisy chain.

When a slot address containing all ones is applied to the next rack's slot address processing circuit 40, which is similar to the one shown in FIG. 4, an AND gate 52 in that circuit will produce a high level output. This high level from AND gate 52 is coupled by OR gate 53 to the first input of each output OR gate 55 to produce a relative slot address having all ones for the next rack in the daisy chain. In this case, the relative address will be all ones regardless of the output from an adder 54 whose multi-bit output is also coupled to the output OR gates 55.

When the processor module 16 desires to access a module in the second rack 13 (or a subsequent rack), it sends the virtual slot address on bus 35. In previous controllers, an address decoder in the second rack had to be configured to respond to a given range of virtual slot addresses, (e.g. addresses 7-10 for rack 13 in FIG. 1). However, the backplane slot address processing circuits 40 in the present programmable control convert the incoming slot address to a relative slot address before passing the address on to the next rack in the chain. This justifying of the slot address to a relative address eliminates the need for each rack to "know" its relative position in the daisy chain and the range of its slot addresses.

With continuing reference to FIG. 4, when a slot in another rack is being addressed, the address number at the input to the slot address processing circuit 40 of the first rack 12 will be equal to or greater than seven, the number of slots in that rack. Therefore, the comparator 47 will apply an active signal onto either output line 48 or 49. These lines are coupled by OR gate 51 to the enable input of a five bit adder 54. When enabled, the adder converts the virtual slot address to a slot address which is relative to the first slot of the second rack 13. To do so, the outputs of the five data buffers 41–45 are coupled to the A set of inputs of the five bit adder 54. The B set of inputs to the adder 54 are hard wired on the backplane to the two's complement of the number of modules within the rack. For example, FIG. 4 illustrates the backplane circuit for the first rack 12 having seven slots so that the B set of inputs to the adder 54 are hard wired to the two's complement of seven, or the binary number 11001. The adder 54 sums the input slot address from the five data buffers 41–45 with the two's complement of the number of slots. This addition is mathematically equivalent to subtracting the number of rack slots from the incoming slot address. The five data bit result of this "subtraction" appearing at the output of adder 54 is connected to inputs of the set of five output OR gates 55. The five OR gates 55 couple the resultant relative address to the next rack 13 over the cable 20.

By subtracting the number of slots in the rack from the slot address before passing the address on to the next rack in the chain, the slot address is justified to be relative to the first slot in the next rack. Therefore, each rack's address decoder 46 can be preset to respond to slot addresses between zero and X−1, where X is the number of slots in that rack. Alternatively, the slot address processing circuit 40 can be configured to respond to the situation in which the slots are assigned addresses from one to X. This preset decoding is independent of the rack's position within the daisy chain, since the input slot address applied to the rack will be relative to its first slot. As a result, when the racks are first interconnected, the backplane circuits do not have to be configured with a virtual address for each rack's first slot and the racks can be connected in any order.

As a specific example to illustrate how a module in the second rack 13 can be addressed, assume that the processor module 16 seeks to access an I/O module in the second slot from the left in the second rack. This slot has a virtual system address of eight being the ninth slot of the daisy chained racks. In accessing the module in this slot, the processor 16 will generate a set of parallel logic level bits on the slot address bus 35 representing the number eight. When these bits are applied to the slot address processing circuit 40 in the first rack 12, the output line 48 of the comparator 47 will go active. Since comparator output line 50 has a low level inactive signal, the decoder 46 for the first rack is disabled and will not activate any of the slot select lines for its modules.

The slot address number "eight" will also be applied to the A set of input terminals of first rack's adder 54 which in response thereto will subtract the number seven from the A input number. The result of this subtraction is the binary number "one" appearing at the output of the adder which is coupled by the OR gates 55 to the slot address lines SA0'-SA4' of cable 20 extending to the second rack 13.

The backplane 18' of the second rack 13 contains a slot address processing circuit 40 which is similar to that shown in FIG. 4 except that it is configured for a four slot rack. That is, the decoder 46 in the second rack responds to binary numbers zero through three appearing on the slot address lines SA'-SA4'. Similarly, the B input of the adder 54 on the backplane of the second rack 13 is wired with the two's complement of the number four and the B input of comparator 47 is wired to the number four.

In this specific example, when the processor module 16 is seeking to access the second module in the second rack 13, the relative slot address applied over cable 20 to the input of the backplane 19 will be the number one. This relative address is coupled by the data buffers 41–45 in the processing circuit 40 of the second rack to its decoder 46 which now is enabled by a high level output signal on line 50 from the comparator 47. In response to these input signals, the decoder 46 will send an active signal on the slot select line for the second slot (slot "one" in the second rack 13).

Therefore, regardless of the order of a given rack within the daisy chain programmable controller system, the address decoding circuitry on the backplane of the rack will respond to slot addresses between zero and X−1, where X is the number of slots within that rack. The present system automatically justifies the slot address by subtracting X from the incoming address before passing it on to the next rack. As a result, no matter how many module slots precede a given rack in the daisy chain, the address signals inputted into the rack to access its modules will have the same preset range, e.g. from zero to X−1. As a result, the address decoding circuit in all the racks can be permanently configured to produce slot select signals in response to slot address in this same range.

What is claimed is:

1. In a programmable controller having a series of racks with slots for holding and electrically interconnecting a plurality of functional modules and a processor module, wherein a given rack comprises:
   a slot address bus which carries a numerical address of a slot containing a functional module that the processor module seeks to access;
   means, coupled to said slot address bus, for subtracting the number of slots in the given rack from the numerical address to produce a resultant slot address signal when a slot in a subsequent rack in the series is being addressed; and
   means for coupling the resultant slot address signal to the slot address bus in another rack of the programmable controller.

2. The programmable controller as recited in claim 1 wherein the given rack further includes means, coupled to the slot address bus, for decoding selected numerical addresses to generate slot selection signals for the given rack.

3. The programmable controller as recited in claim 1 wherein the means for subtracting includes an adder having a first input coupled to the slot address bus and a second input which receives a number representing the two's complement of the number of slots in the given rack.

4. The programmable controller as recited in claim 1 wherein said means for coupling includes means for setting the resultant slot address signal to a predefined value whenever a slot in the given rack is being addressed, said predefined value for signalling another rack in the series that a slot being addressed is not in that other rack.

5. In a programmable controller having a plurality of cascade connected racks with slots for holding and electrically interconnecting a plurality of functional modules, each rack slot having an address defined by the serial interconnection of the racks, and the programmable controller also having a processor module which produces a numerical address of a slot containing a module to be accessed, each of said racks comprising:
   a slot address bus which carries a numerical address of the slot containing a module that the processor seeks to access;
   means, coupled to the slot address bus, for decoding the address to generate a slot enable signal for the module located in an addressed slot;
   means for subtracting the number of slots in the rack from the numerical address to produce a resultant address when a slot in a subsequent rack in the cascade is being addressed; and
   means for coupling the resultant address to the slot address but of the next serially interconnected rack of the programmable controller.

6. The programmable controller as recited in claim 5 wherein said means for decoding responds to addresses from zero to $X-1$, where X is the number of slots in the rack.

7. The programmable controller as recited in claim 5 wherein said means for decoding responds to addresses from Y to $Y+X-1$, where Y is an integer constant and X is the number of slots in the rack, by generating X slot enable signals.

8. The programmable controller as recited in claim 5 wherein said means for coupling includes means for setting the resultant slot address signal to a predefined number whenever a slot in the rack is being addressed, said predefined number for signalling another rack in the cascade that a slot being addressed is not in that other rack.

9. A rack for a multiple rack programmable controller system having a plurality of slots for holding and electrically interconnecting different functional modules, said rack comprising:
   a slot address bus which carries a signal, received from an apparatus coupled to the rack and which contains a numerical address corresponding to one of the plurality of slots;
   means for subtracting the number of slots in the rack from the numerical address to produce a resultant slot address signal when a slot being addressed is in another rack of the programmable controller system, said means for subtracting being coupled to said slot address bus; and
   means for coupling the resultant slot address signal to the slot address bus of the other rack of the programmable controller system.

10. The rack as recited in claim 9 further including means, coupled to the slot address bus, for decoding selected addresses to generate slot enable signals for the rack.

11. The rack as recited in claim 10 wherein said means for decoding responds to addresses from zero to $X-1$, where X is the number of slots in the rack, by generating X slot enable signals.

12. The rack as recited in claim 10 wherein said means for decoding responds to addresses from Y to $Y+X-1$, where Y is an integer constant and X is the number of slots in the rack, by generating X slot enable signals.

13. The rack as recited in claim 9 wherein the means for subtracting includes an adder having a first input coupled to the slot address bus and a second input which receives a number representing the two's complement of the number of slots in the rack.

14. The rack as recited in claim 9 wherein said means for coupling includes means for setting the resultant slot signal to a predefined number whenever a slot in the rack is being addressed, said predefined number signalling that a slot being addressed is not in the other rack in the series.

15. The rack as recited in claim 14 further comprising means to force said means for setting to set the resultant slot address signal to the predefined number whenever the numerical address contained in the signal carried by said slot address bus has a value equal to the predefined number.

* * * * *

UNITED STATES PATENT AND TRADEMARK OFFICE
CERTIFICATE OF CORRECTION

PATENT NO. : 5,038,317

DATED : August 6, 1991

INVENTOR(S) : John E. Callan et al.

It is certified that error appears in the above-identified patent and that said Letters Patent is hereby corrected as shown below:

On the cover sheet after "Assignee: Allen-Bradley Company, Inc., Milwaukee, Wis." insert --; and Nippondenso Company, Ltd., Japan--.

Signed and Sealed this

Ninth Day of February, 1993

Attest:

STEPHEN G. KUNIN

Attesting Officer

Acting Commissioner of Patents and Trademarks